US012801708B2

(12) United States Patent
Kolych et al.

(10) Patent No.: US 12,801,708 B2
(45) Date of Patent: Nov. 17, 2026

(54) FACE IDENTIFICATION USING MULTIMODAL IMAGING DATA

(71) Applicant: Cypress Semiconductor Corporation, San Jose, CA (US)

(72) Inventors: Igor Kolych, Lviv (UA); Daniel Lee, Salt Lake City, UT (US)

(73) Assignee: Infineon Technologies Americas Corp., El Segundo, CA (US)

( * ) Notice: Subject to any disclaimer, the term of this patent is extended or adjusted under 35 U.S.C. 154(b) by 84 days.

(21) Appl. No.: 18/593,809

(22) Filed: Mar. 1, 2024

(65) Prior Publication Data

US 2025/0278463 A1 Sep. 4, 2025

(51) Int. Cl.

| | |
|---|---|
| ***G06F 21/32*** | (2013.01) |
| ***G01S 13/90*** | (2006.01) |
| ***G06T 7/50*** | (2017.01) |
| ***G06T 17/00*** | (2006.01) |
| ***G06V 40/16*** | (2022.01) |

(52) U.S. Cl.

CPC .............. *G06F 21/32* (2013.01); *G01S 13/90* (2013.01); *G06T 7/50* (2017.01); *G06T 17/00* (2013.01); *G06V 40/172* (2022.01); *G06T 2207/30168* (2013.01)

(58) Field of Classification Search

CPC ......... G06F 21/32; G01S 13/90; G06T 17/00; G06T 2207/30168; G06T 7/50; G06V 40/172

USPC .......................................................... 713/186

See application file for complete search history.

(56) References Cited

U.S. PATENT DOCUMENTS

| | | | | |
|---|---|---|---|---|
| 10,228,460 | B1 * | 3/2019 | Jinkins | G01S 7/24 |
| 2017/0200273 | A1 * | 7/2017 | Kamilov | G01S 17/86 |
| 2018/0218228 | A1 * | 8/2018 | Takaki | G06V 20/58 |
| 2019/0258788 | A1 * | 8/2019 | Hyun | G06V 40/19 |
| 2020/0057847 | A1 * | 2/2020 | Oh | G06V 40/19 |
| 2020/0219264 | A1 * | 7/2020 | Brunner | G01S 7/4808 |
| 2020/0311899 | A1 * | 10/2020 | Piette | G01S 17/87 |
| 2021/0279311 | A1 * | 9/2021 | Grewal | G06F 21/45 |
| 2022/0036750 | A1 * | 2/2022 | Poojary | G06T 7/521 |
| 2022/0070236 | A1 * | 3/2022 | Yerli | H04L 63/0861 |
| 2022/0366640 | A1 * | 11/2022 | Lasram | G06T 5/50 |
| 2023/0038842 | A1 * | 2/2023 | Yu | G06N 3/084 |
| 2023/0051980 | A1 * | 2/2023 | Tammannagari | G06F 21/32 |
| 2023/0293940 | A1 * | 9/2023 | Forsgren | A63B 57/00 473/199 |
| 2023/0344705 | A1 * | 10/2023 | Amini | G06V 20/41 |
| 2023/0394691 | A1 * | 12/2023 | Guizilini | G01S 13/931 |
| 2025/0076487 | A1 * | 3/2025 | Sakthi | G06V 10/751 |
| 2025/0206331 | A1 * | 6/2025 | Sane | B60W 60/001 |

* cited by examiner

*Primary Examiner* — David P Zarka

(57) ABSTRACT

A device includes an image capture device to obtain first imaging data, a sensor, and control logic coupled to the sensor. The control logic is to obtain sensor data from the sensor, generate second imaging data from the sensor data, determine a first correlation metric between the first imaging data and the second imaging data, determine whether the first correlation metric satisfies an authentication criterion, and enable an authentication operation responsive to determining the first correlation metric satisfies the authentication criterion.

17 Claims, 8 Drawing Sheets

FACE IDENTIFICATION USING MULTIMODAL IMAGING DATA

TECHNICAL FIELD

Embodiments of the disclosure relate generally to authentication systems, and more specifically, relate to authentication systems that use imaging data for user authentication.

BACKGROUND

User authentication systems that rely on two-dimensional (2D) facial identification can be susceptible to exploitation. A malicious actor may defeat the facial identification by presenting a still or video image of an authenticated user's face to a camera of the authentication system.

BRIEF DESCRIPTION OF THE DRAWINGS

The disclosure is illustrated by way of example, and not of limitation, in the figures of the accompanying drawings.

DETAILED DESCRIPTION

Figure 1:
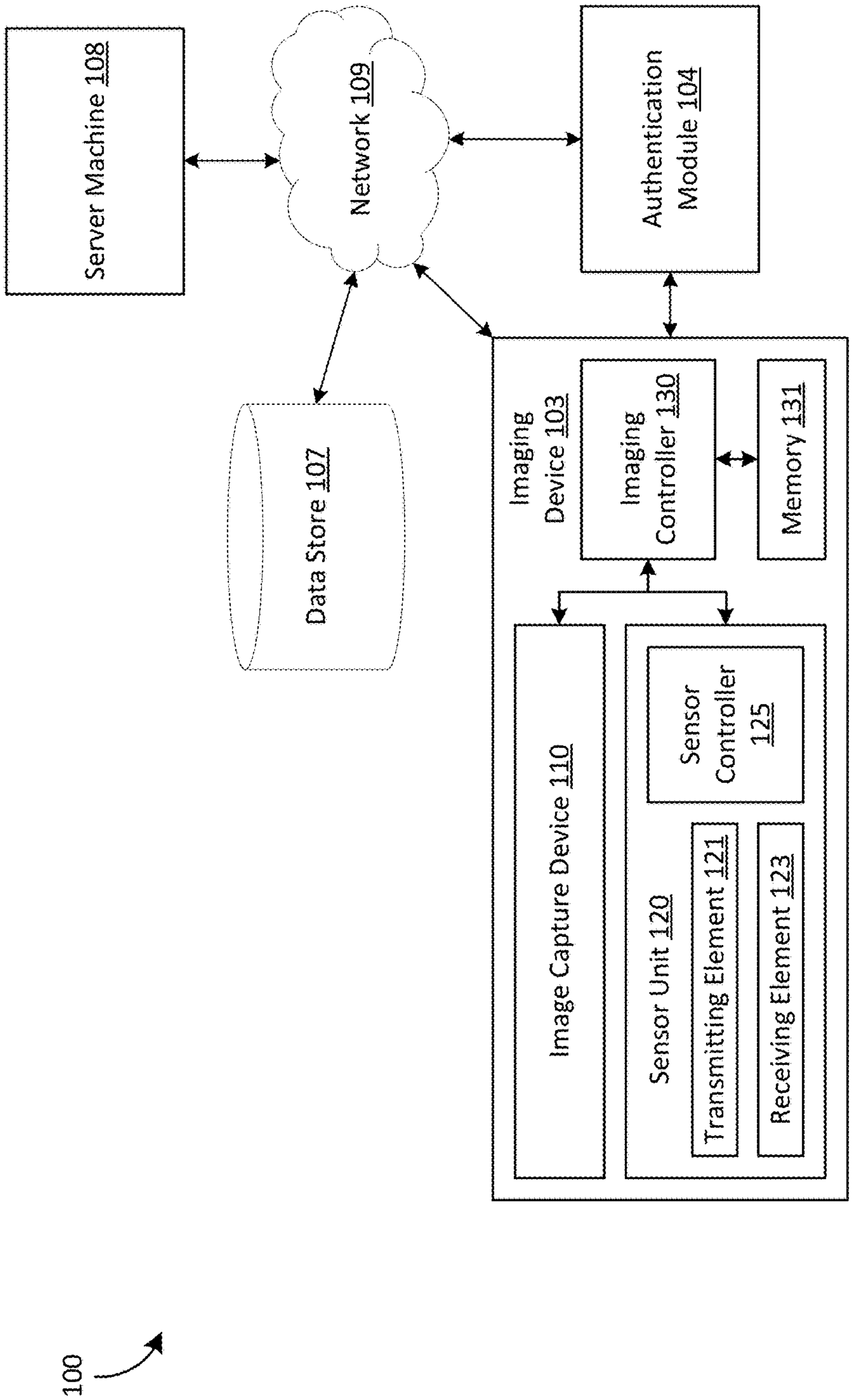
FIG. 1 illustrates an example system, according to aspects of the disclosure.

In user security and authentication systems, facial identification can be a convenient method to determine whether a user is an authenticated user. Often, a camera can be used to capture an image of the user. Image processing techniques can be applied to the user image to determine whether the captured image matches a stored image of an authenticated user. If the authentication system determines that the captured image matches a stored image of an authenticated user, the authentication system can indicate that the user is an authenticated user.

A malicious actor may present the camera with a still or video image of an authenticated user in place of the malicious actor's face, and the authentication system can incorrectly identify the user as an authenticated user, thus improperly granting the malicious actor access to a secured resource (e.g., secure location secure electronic database, etc.). This attack vector can be referred to as "spoofing," in which the malicious actor attempts to disguise a communication, device, system, or biological data as something legitimate (e.g., as belonging to an authenticated user). Authentication systems relying on a single form of facial identification can be vulnerable to this attack vector. In some instances, the malicious actor might use a deep-fake neural network to generate the still or video image of the authenticated user's face.

Some solutions attempt to mitigate these risks using a Light Detection and Ranging (LIDAR) sensor or by using a time-of-flight (TOF) sensor. However, both LIDAR and TOF sensors can be expensive. For these and other reasons, many authentication systems that use facial identification unit (especially low-cost facial identification units) can be vulnerable to attack (e.g., by relying on 2D facial identification from a single image capture device) or inconvenient (e.g., by requiring a second form of user verification, such as a password, secondary biometric data, etc.).

Aspects of the disclosure address the above and other deficiencies by providing a device which can use an image capture device and one or more sensors to capture and compare multiple modes of imaging and/or sensor data to perform facial identification (e.g., for an authentication system). If the multiple modes of imaging data are correlated, the multiple modes of imaging data can be combined into a single dataset representing multimodal imaging data. As used herein, "multimodal imaging data" can represent composite imaging data that is compiled from various modes data, including imaging data (e.g., pictures, video, etc. captured from a camera), and sensor data (e.g., captured by proximity sensors, Radio Detection and Ranging (RADAR) sensors, ultrasonic sensors, etc.). If the multimodal imaging data satisfies an authentication criterion, an authentication operation can be enabled. If the multimodal imaging data does not satisfy the authentication criterion, the authentication operation is not enabled.

The device can obtain imaging data from the image capture device and sensor data from a sensor. In some embodiments, control logic of the device (e.g., in a device controller such as a processor) can generate sensor imaging data from the sensor data.

In some embodiments, the multiple modes of imaging data can be correlated if data from a first mode of imaging data exceeds a correlation threshold with respect to a second mode of imaging data (e.g., data of the first mode has a sufficient overlap or similarity with data of the second mode). For example, the first and second mode of imaging data can be correlated if each mode shares or reflects a certain quantity of underlying data (e.g., three-dimensional (3D) coordinates (x-, y-, z-coordinates) or measurements), provided the certain quantity exceeds a correlation threshold. In another example, the first and second mode of imaging data may not be correlated if each mode does not share or reflect a certain quantity of underlying data (e.g., the certain quantity of shared data does not exceed the correlation threshold).

In some embodiments, the authentication criterion can be satisfied if the multiple modes are sufficiently correlated (e.g., a correlation metric between the multiple modes of imaging data satisfies the authentication criterion). In some embodiments, the authentication criterion can be satisfied if the multimodal imaging data matches multimodal imaging data corresponding to an authenticated user. In some embodiments, if the authentication criterion is not satisfied, the device can perform the capture and processing operations again (e.g., attempt to re-verify the user). In some embodiments, the device can provide instructions to the user for how to reorient their face with respect to the device, or instructions for how to reorient the device to improve the user facial data captured by the device (e.g., imaging data and/or sensor data). In some embodiments, the device can perform the capture and processing operations multiple times to collect additional data.

FIG. 1 illustrates an example of a system 100, according to aspects of the disclosure. The system 100 includes an imaging device 103 (e.g., face identification device) coupled to an authentication module 104. In some embodiments (as illustrated) the imaging device 103 and the authentication module 104 can be connected to a data store 107 and a server machine 108 by network 109. In some embodiments, the imaging device 103 can be coupled to the authentication module 104 through the network 109 (not illustrated). In some embodiments, the imaging device 103 and/or the authentication module 104 can be coupled directly to the data store 107 (not illustrated). In some embodiments, multiple imaging devices can be connected to the network 109. For example, imaging devices 103 may be placed at each entry door to a secured facility. In some embodiments, an authentication module 104 can be paired with each of the imaging device 103. In some embodiments, one or more of the imaging devices can couple to a single authentication module (e.g., authentication module 104). In some embodiments, (not illustrated) one or more elements of system 100 can be paired with a physical object, such as a door. In some embodiments, (not illustrated), one or more elements of system 100 can be included in a single device, such as a personal computer, mobile device, security camera, security interface device, etc.

In some embodiments, the imaging device 103 can include image capture device 110, sensor unit 120, imaging controller 130, and memory 131. The imaging device 103 can capture one or more sets of imaging data at image capture device 110, and one or more sets of sensor data at sensor unit 120. Using two or more of the imaging data and the sensor data, the imaging device 103 can generate multimodal imaging data. In some embodiments, the multimodal imaging data can be used by the authentication module 104 to determine whether a user is an authenticated user. Additional image capture devices 110 and sensor units 120 are not illustrated as elements of system 100 in FIG. 1, however, it can be appreciated that imaging device 103 can include additional image capture devices and/or additional sensor units that operate the same as, or similar to image capture device 110 and sensor unit 120, respectively.

Image capture device 110 can capture imaging data. In some embodiments, image capture device 110 can include an optical sensor and one or more lenses. In some embodiments, the image capture device 110 can be a camera. In some embodiments, the image capture device can be configured to capture a specific band, or wavelength of light. For example, the image capture device can be a visible light image capture device configured to capture visible light wavelengths (e.g., approximately 380 nanometers (nm) through 750 nm). In another example, the image capture device can be an infrared image capture device configured to capture infrared wavelengths (e.g., 750 nm through 1 millimeter (mm)). The image capture device 110 can provide the captured imaging data (e.g., images or sequential video frames) to the imaging controller 130 of the imaging device 103. In some embodiments, the image capture device 110 can provide the captured imaging data images or video to the imaging controller 130 in real-time (e.g., the speed at which electrical signals can travel through an electrical conductor, or optical signals can travel through an optical link).

In some embodiments, the imaging controller 130 can cause the imaging capture device 110 to capture imaging data. For example, the imaging device 103 can indicate when the image capture device 110 is to begin capturing imaging data and/or when the image capture device 110 is to stop capturing imaging data. In some embodiments, the image capture device 110 can capture still images and/or video images. In some embodiments, the imaging device 103 can indicate to the image capture device 110 whether to capture a still or a video image. In some embodiments, multiple image capture devices 110 can capture imaging data. Imaging data from each image capture device can be sent to the imaging controller 130 for processing.

Sensor unit 120 can capture sensor data. Sensor data can include a transmitting element 121, a receiving element 123, and a sensor controller 125. In some embodiments, the sensor controller 125 can generate a signal, which is transmitted by the transmitting element 121. The receiving element 123 can capture reflections or "echoes" of a portion of the transmitted signal. Using the intensity of the reflected signal, a time since the pulse was transmitted, an angle the reflected signal struck the signal, or other similar components of the reflected signal, the sensor controller 125 can determine one or more positional datapoints of the object that reflected a portion of the pulse. Sensor data captured by the sensor unit 120 can be sent by sensor controller 125 to the imaging controller 130 for processing.

In some embodiments, the sensor unit 120 can include for example, a Synthetic Aperture Radar (SAR) unit, a thermal imaging sensor unit, a Radio Detection and Ranging (RADAR) unit, a Sound Navigation and Ranging (SONAR) unit, an ultrasonic sensor unit, a hyperspectral imaging sensor unit, an electromagnetic field sensor unit, a radio frequency (RF) sensor unit, or a magnetic resonance imaging (MRI) unit. For example, an RF sensor unit (e.g., sensor unit 120) can use a transmitting RF antenna (e.g., transmitting element 121) to transmit one or more radio waves, and reflections of a portion of those radio waves can be detected by one or more receiving RF antenna (e.g., receiving element 123). In another example, an ultrasonic sensor unit (e.g., sensor unit 120) can use a sonic transducer (e.g., transmitting element 121) to propagate one or more ultrasonic sound waves, and reflections of a portion of those ultrasonic sound waves can be detected by one or more receiving sonic transducers (e.g., receiving element 123). In some embodiments, the sensor unit 120 can transmit (e.g., via transmitting element 121) and receive (e.g., via receiving element 123) through various materials including solids, liquids, gasses, and/or any such combination.

In some embodiments, an RF sensor can be configured to transmit and receive (e.g., operate) at various wavelengths of electromagnetic radiation (e.g., which can be expressed inversely as "frequencies"). In some embodiments, the RF sensor can operate at least one of the electromagnetic radiation operational bands defined by the Institute of Electrical and Electronics Engineers (IEEE) including, the very high frequency (VHF)-band (30 megahertz (MHz) to 300 MHz), the ultra-high frequency (UHF) band (300 MHz to 1 gigahertz (GHz)), the L-band (1 GHz to 2 GHz), the S-band (2 GHz to 4 GHz), the C-band (4 GHz to 8 GHz), the X-band (8 GHz to 12 GHz), the $K_u$-band (12 GHz to 18 GHz), the K-band (18 GHz to 27 GHz), the $K_a$-band (27 GHz to 40 GHz), the V-band (40 GHz to 75 GHz), the W-band (75 GHz to 110 GHz), or the G-band, also referred to as mm-band (e.g., millimeter-band) (110 GHz to 300 GHz). In some embodiments, the RF sensor can operate within the frequency range assigned in North America for wireless local area network (WLAN) communications (e.g., 2.4 GHz, 5 GHz, 6 GHz, 45 GHz, or 60 GHz, etc.). In is noted that millimeter-wave (mm wave, or mmWave) can refer to, for example, WLAN communication frequencies such as 45 GHz and 60 GHz, and is distinct from the mm-band IEEE designation covering 110 GHz to 300 GHz.

The imaging controller 130 can receive imaging data from the image capture device 110 and sensor data from the sensor unit 120. The imaging controller 130 can compare the imaging data to the sensor data, to determine whether the imaging data correlates to the sensor data. If the imaging data and the sensor data are correlated, the imaging device 103 can indicate the correlation to the authentication module 104. In some embodiments, the imaging device 103 can combine the imaging data with the sensor data to obtain multimodal imaging data. The multimodal imaging data can be sent to the authentication module 104 for processing.

In some embodiments, the imaging controller 130 can generate sensor imaging data based on one or more sets of sensor data corresponding to respective sensors (e.g., sensor unit 120). For example, the imaging controller 130 can generate sensor imaging data using RF sensor data, ultrasonic sensor data, or a combination of RF sensor data and ultrasonic sensor data. As similarly described above, the imaging controller 130 can compare and/or combine the imaging data with the sensor imaging data to obtain multimodal imaging data.

In some embodiments, imaging controller 130 can determine to perform one or more actions based on data received from image capture device 110 and/or data received from sensor unit 120. For example, imaging controller 130 can receive imaging data from image capture device 110. Based on the received imaging data, the imaging controller 130 can determine that the sensor unit 120 is to being capturing sensor data. In another example, imaging controller 130 can receive sensor data from the sensor unit 120. Based on the received sensor data, the imaging controller 130 can determine that the image capture device 110 is to begin capturing imaging data.

In some embodiments, imaging data from the image capture device 110 and/or sensor data from the sensor unit 120 can be received at and/or stored in memory 131. Imaging controller 130 can obtain imaging data and/or sensor data from memory 131 as needed to determine whether the imaging data corresponds to the sensor data (as described above) for a given user (not illustrated). In some embodiments, the memory 131 can be a volatile or a non-volatile memory device. In some embodiments, the memory 131 can store instructions (e.g., control logic) for the imaging controller 130.

The authentication module 104 can include an aggregated dataset of multimodal imaging data for authenticated users (e.g., stored user facial data). In some embodiments, the aggregated dataset can be stored in a memory of the authentication module 104 (not illustrated) or in the data store 107. The imaging device 103 can provide multimodal imaging data (e.g., user facial data of a user of the system 100) to the authentication module 104, and the authentication module 104 can determine whether the provided multimodal imaging data (e.g., user facial data) matches any set of multimodal imaging data in the aggregated dataset (e.g., stored user facial data of authenticated users). That is, an authentication criterion of the authentication module 104 can be satisfied if the provided multimodal imaging data corresponds to (e.g., is the same as, similar to, or within a predetermined tolerance of) any stored set of multimodal imaging data in the aggregated dataset. For example, and in some embodiments, the authentication criterion can reflect a threshold percentage match between data of the provided multimodal imaging data, and data of a certain set of multimodal imaging data in the aggregated dataset.

In some embodiments, the authentication module 104 can pair the provided multimodal imaging data (e.g., user facial data) with a particular set of multimodal imaging data (e.g., a particular stored user facial data) in the aggregated dataset based on a satisfaction of the authentication criterion. For example, multimodal user facial data of a particular user can be provided to the authentication module 104. The authentication module 104 can identify the particular user by determining that a particular set of stored multimodal authenticated user facial data in the aggregated dataset matches the provided multimodal user facial data (e.g., the user of the system 100 is the authenticated user "John"). In some embodiments, the authentication module 104 does not pair the provided multimodal imaging data to any particular set of multimodal imaging data in the aggregated dataset. For example, multimodal user facial data of a particular user can be provided to the authentication module 104. The authentication module 104 can identify the particular user as belonging to the group of authenticated users by determining that the provided multimodal user facial data matches any set of stored multimodal authenticated user facial data in the aggregated dataset (e.g., the user of the system 100 is an authenticated user).

The authentication module 104 can indicate whether the authentication criterion has been satisfied. In some embodiments, the authentication module 104 can instruct the imaging device 103 to provide additional multimodal imaging data. In some embodiments, the indication can be sent to server machine 108. In some embodiments, the indication can be sent to another component of system 100, such as the imaging device 103 or the data store 107. In some embodiments, the indication can be sent to another non-illustrated component. In some embodiments, an indication that the authentication criterion has been satisfied can cause the user of the system 100 to be granted access to a secured location or electronic database. In some embodiments, the authentication module 104 can directly grant the user of the system 100 access to the secured location or electronic database.

Data store 107 can be a persistent storage that is capable of storing data such as imaging data, sensor data, sensor imaging data, and multimodal imaging data, etc. Data store 107 can be hosted by one or more storage devices, such as main memory, magnetic or optical storage based disks, tapes or hard drives, network-attached storage (NAS), storage area network (SAN), and so forth. In some embodiments, data store 107 can be a network-attached file server, while in other embodiments the data store 107 can be another type of persistent storage such as an object-oriented database, a relational database, and so forth, that can be hosted one or more different machines coupled to network 109. In some embodiments, data store 107 can be capable of storing one or more data items, as well as data structures to tag, organize, and index the data items. A data item can include various types of data including structured data, unstructured data, vectorized data, etc., or types of digital files, including text data, audio data, image data, video data, multimedia, interactive media, data objects, and/or any suitable type of digital resource, among other types of data. An example of a data item can include a file, database record, database entry, programming code or document, among others.

In some embodiments, server machines 108 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to by the imaging device 103 or authentication module 104 to identify and/or authenticate the face of a user.

In some embodiments, network 109 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

In situations in which the system 100 discussed here collects personal information about users, or can make use of personal information, the users of the system 100 can be provided with an opportunity to control whether or how the system 100 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. In another example, the authentication data used by the authentication module 104 can be aggregated, and personally identifiable information that connects a particular multimodal imaging dataset to a specific person. That is, the aggregated authentication dataset can include multiple multimodal imaging datasets of authenticated users, and if input multimodal imaging data (e.g., from imaging device 103) matches any one of the multimodal imaging datasets of the aggregated authentication dataset, the authentication module can authenticate the user of the system 100. Thus, the user may have control over how information is collected about the user and used by the system 100.

Figure 2:
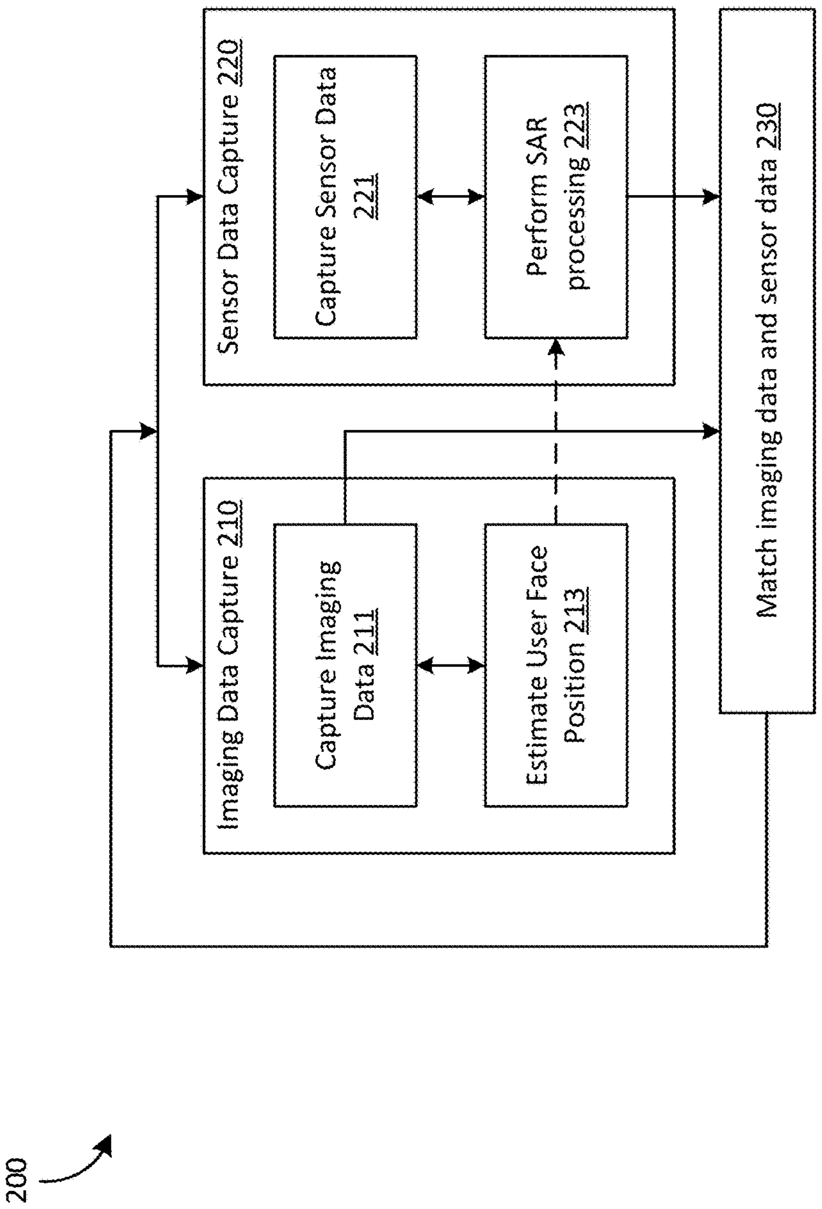
FIG. 2 is an example flow diagram of a method for using a multimodal facial identification system, according to aspects of the disclosure.

FIG. 2 is an example flow diagram of a method 200 for using a multimodal facial identification system, according to aspects of the disclosure. In some embodiments, the multimodal facial identification system can be same as, or similar to the system 100 as described with reference to FIG. 1. The method 200 can be performed by processing logic that can include hardware e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by imaging device 103 and/or the authentication module 104 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, operations in imaging data capture 210 (e.g., operations 211 and 213) can be performed simultaneously (e.g., in parallel with) operations in sensor data capture 220 (e.g., operations 221 and 223). Additional details regarding the imaging data capture 210 and sensor data capture 220 are described below with reference to FIGS. 3A-B.

At operation 211, control logic performing the method 200 causes imaging data to be captured. In some embodiments, the control logic can indicate to an imaging device, such as imaging device 103 of FIG. 1, that imaging data is to be captured. In some embodiments, the control logic can receive imaging data without causing the imaging data to be captured. The imaging data can be temporarily stored (e.g., in memory 131) for processing during operation 230.

At operation 213, the control logic estimates a subject face position. In some embodiments, the control logic can determine whether the position of the user's face provides the image capture device with suitable imaging data. If the control logic determines that the imaging data is not suitable (e.g., due to improper lighting, improper position, angle, or rotation of the subject's face, etc.) the control logic can generate an indication to be provided to the user. For example, the control logic can indicate that the user should rotate their face to the right or left so that the image capture device can capture suitable imaging data. In some embodiments, information obtained at operation 213 can be used as instructions to perform operation 211 again in order to obtain new imaging data.

The control logic can extract position information from the imaging data (e.g., x-, y-coordinate information). The control logic can use this extracted position information during the sensor data capture 220 (e.g., in operation 223 as illustrated). In some embodiments, the control logic can commence imaging data capture 210, and upon determining the user face position satisfies a threshold criterion (e.g., a distance from the image capture device), the control logic can commence sensor data capture 220.

At operation 221, the control logic causes sensor data to be captured. In some embodiments, the control logic can indicate to an imaging device, such as imaging device 103, that sensor data is to be captured. In some embodiments, the control logic can receive the sensor data without causing the sensor data to be captured. The sensor data can be temporarily stored (e.g., in memory 131) for processing during operations 223 and/or operations 230.

At operation 223, the control logic performs SAR processing on the sensor data captured at operation 221. In some embodiments, at operation 223, the user face position obtained from operation 213 can be used to refine the SAR processing algorithm. For example, the SAR processing algorithm can use the user face position obtained from operation 213 to identify portions of the captured sensor data that correspond to the imaging data. In another example, the SAR processing algorithm can use the user face position obtained from operation 213 to capture new sensor data by steering a SAR sensing element (e.g., a SAR antenna) along an electronic path generated based on the user face position obtained from operation 213. That is, in some embodiments, information generated during operation 223 can be used to perform operation 221 again to capture new sensor data.

In some embodiments, at operation 223 the control logic can convert the sensing data into sensor imaging data. In some embodiments, sensor data can be converted into sensor imaging data with an algorithm, or machine learning model. In some embodiments, portions of sensor data can be extracted as sensor imaging data. For example, sensor data can include a set of distances between the sensing element (such as the receiving element 123 of FIG. 1) and the user's face. The distances can be converted or transformed into x-, y-, and z-coordinate information (e.g., position and depth information) which can be represented as sensor imaging data. In some embodiments, the transformation can be performed at operation 230.

At operation 230, the control logic matches the imaging data from imaging data capture 210 and the sensor data from sensor data capture 220. In some embodiments, operation 230 can be performed using an algorithm or machine learning model. The control logic can compare a portion of the imaging data with a portion of the sensing data. The control logic can determine a correlation metric between the imaging data and the sensor data. In some embodiments, if the correlation metric between the respective portions satisfies a correlation threshold, the indication can be provided to an authentication module (e.g., authentication module 104 of FIG. 1). In some embodiments, if the correlation metric between the respective portions does not satisfy a correlation threshold, control logic can determine a second correlation metric between a second portion of the imaging data and a second portion of the sensing data. In some embodiments, if the correlation metric between the respective portions does not satisfy the correlation threshold, control logic can indicate that new imaging data and new sensor data are to be captured (e.g., that imaging data capture 210 and sensor data capture 220 are to be performed again). In some embodiments, additional imaging data and/or sensor data can be captured and used to determine correlation metrics. For example and in some embodiments, the control logic can determine a third correlation metric between a third portion of the imaging data, a third portion of the sensing data, and a portion of second sensing data captured by a second sensing unit.

Figure 3A:
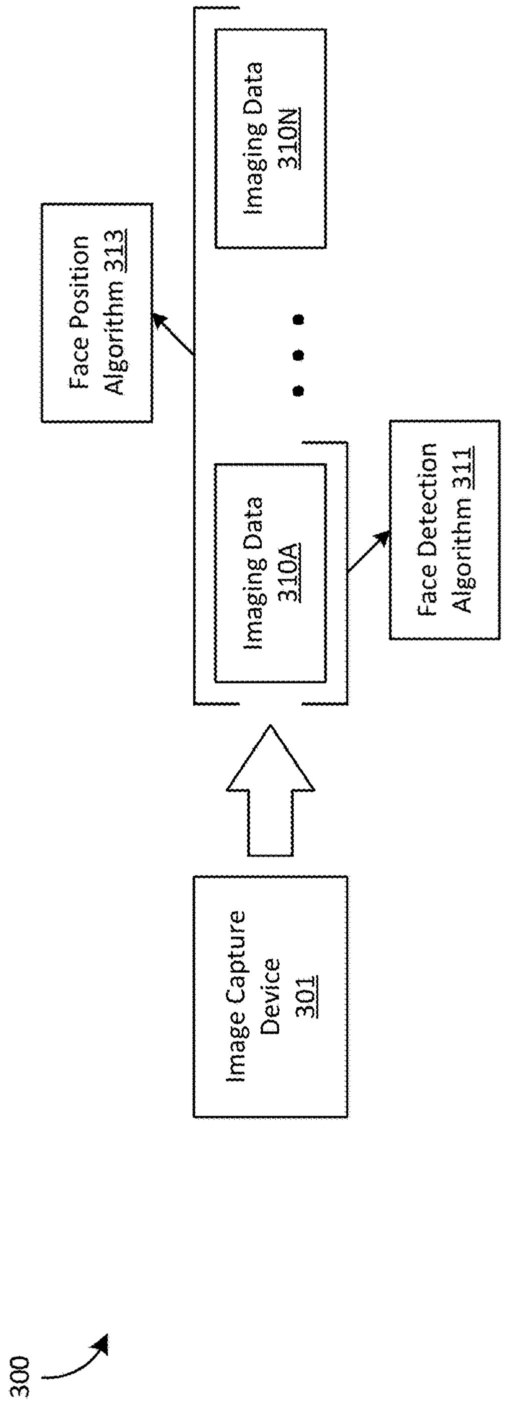
FIGS. 3A-B illustrate capturing imaging data and sensor data with an image capture device and a sensor unit respectively, according to aspects of the disclosure.
Figure 3B:
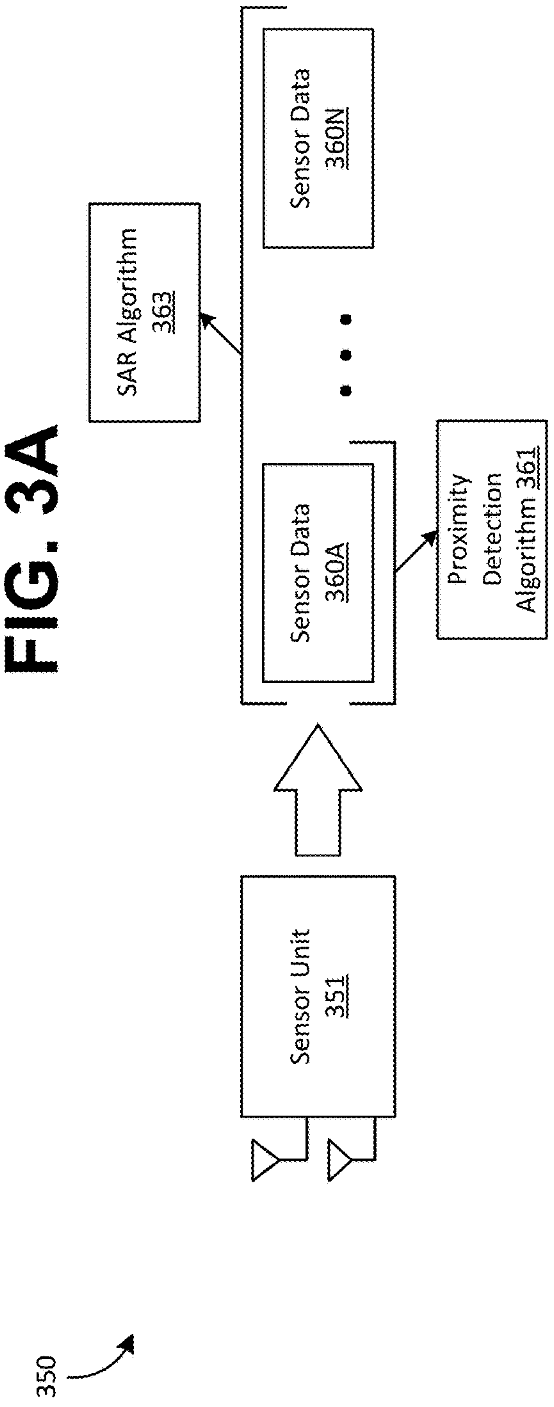

FIGS. 3A-B illustrate capturing imaging data 310 and sensor data 360 with image capture device 301 and sensor unit 351 respectively, according to aspects of the disclosure. As described above, imaging data 310 and sensor data 360 can be captured simultaneously (e.g., in parallel). In some embodiments, capturing the imaging data 310 and/or sensor data 360 can be dependent on information extracted from previously collected imaging data 310 and/or sensor data 360. For example, information extracted from imaging data 310 can be used to alter how the sensor unit 351 is to capture sensor data 360, and/or information from sensor data 360 can be used to alter how image capture device 301 is to capture imaging data 310.

In some embodiments, the face detection algorithm 311 and the face position algorithm 313, and the proximity detection algorithm 361 and the SAR algorithm 363, can be performed by control logic of a controller, such as imaging controller 130 of imaging device 103. In such embodiments, the imaging data 310A-N and the sensor data 360A-N respectively can be received at the controller from the image capture device 301 and the sensor unit 351, respectively.

In FIG. 3A, an example of a block diagram 300 for capturing imaging data 310 with an image capture device 301 is illustrated. In some embodiments, the image capture device 301 can be the same as, or similar to the image capture device 110 of FIG. 1.

Image capture device 301 can capture imaging data 310A through imaging data 310N (e.g., imaging data 310A-N). In some embodiments, the face detection algorithm 311 can use imaging data 310A-N to determine whether a scene (e.g., represented by imaging data 310) captured by the image capture device 301 includes facial data and/or non-facial data. If the face detection algorithm 311 detects that the imaging data 310 includes facial data, the image capture device 301 can provide imaging data 310A-N to a face position algorithm 313. In this way, the face position algorithm 313 is not needlessly performed when imaging data 310A-N does not include facial data.

In some embodiments, the face position algorithm 313 can use imaging data 310A-N to determine a face position of a user (e.g., a user of the system 100). The face position algorithm 313 can extract facial information from non-facial information present in each of imaging data 310A-N and can determine a relative facial position of the user's face. In some embodiments, data from the non-facial information in the imaging data 310A-N can be used to determine the facial position of the user's face. In some embodiments, multiple sets of the imaging data 310A-N can be used to improve the accuracy of the face position algorithm. In some embodiments, the face position algorithm 313 can generate facial position data (e.g., a facial position) as an output.

In FIG. 3B, an example of a block diagram 350 for capturing sensor data 360 with a sensor unit 351 is illustrated. In some embodiments, the sensor unit 351 can be the same as, or similar to the sensor unit 120 of FIG. 1.

Sensor unit 351 can capture sensor data 360A through sensor data 360N (e.g., sensor data 360A-N). In some embodiments, the proximity detection algorithm 361 can use sensor data 360A-N to determine whether a scene (e.g., represented by sensor data 360) captured by the sensor unit 351 includes an object. In some embodiments, the proximity to the sensor unit 351 is can be configured, or can be based on a predetermined proximity (e.g., distance) to the sensor unit 351. If the proximity detection algorithm 361 detects that an object is proximate to the sensor unit 351, the sensor unit can provide the sensor data 360A-N to a SAR algorithm 363. In this way, the SAR algorithm 363 is not needlessly performed an object (e.g., face of a user) is not proximate to the sensor unit 351.

In some embodiments, the SAR algorithm 363 can use sensor data 360A-N to determine information about the face of the user (e.g., a user of the system 100). In some embodiments, the SAR algorithm 363 can use additional information to determine information about the face of the user from the sensor data 360A-N. For example, and in some embodiments, the SAR algorithm 363 can accept facial position data (e.g., output from the face position algorithm 313) as input data alongside the sensor data 360A-N. The facial position data can indicate which portions of the sensor data 360A-N are more likely to have relevant information about the face of the user. In some embodiments, the SAR algorithm can be used to generate an electronic path to steer a sensing element (e.g., an SAR antenna) so as to collect sensor data 360A-N (e.g., beamforming). In some embodiments, the SAR algorithm can generate facial position data (e.g., a facial position) as an output. In some embodiments, the SAR algorithm can generate a sensor imaging data as an output. In some embodiments, the output from the SAR algorithm can be used by a control logic of a controller such as imaging controller 130 of FIG. 1 to generate sensor imaging data.

Figure 4:
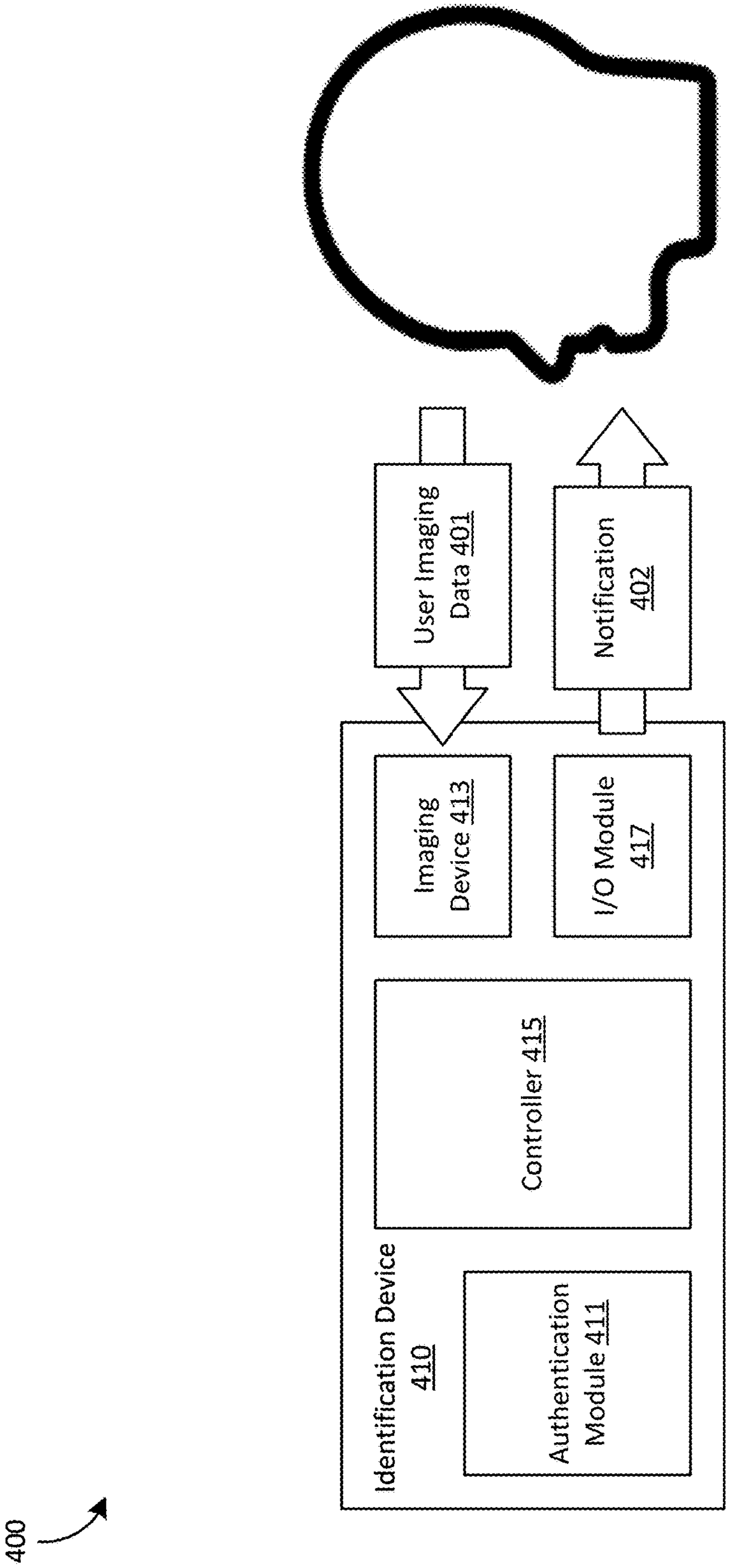
FIG. 4 is an example block diagram for performing facial identification using an identification device, according to aspects of the disclosure.

FIG. 4 is an example of a block diagram 400 for performing facial identification using an identification device 410, according to aspects of the disclosure. The block diagram 400 illustrates the interactions of a user (e.g., user imaging data 401 and notification 402) with an identification device 410.

The identification device 410 includes authentication module 411 (e.g., authentication module 104 of FIG. 1), imaging device 413 (e.g., imaging device 103 of FIG. 1), controller 415, and an input/output module (e.g., I/O module 417). Using the imaging device 413, the identification device 410 captures user imaging data 401 of a user. As used with reference to FIG. 4, user imaging data 401 includes imaging data such as can be captured by an image capture device (e.g., image capture device 110) and sensor data such as can be captured by a sensor unit (e.g., sensor unit 120).

The controller 415 processes the imaging data, and provides the processed imaging data to the authentication module 411. In some embodiments, the controller 415 can cause the I/O module 417 to send a notification 402 to the user. For example, the notification 402 can indicate that the authentication was successful. In another example, the notification 402 can provide instructions to the user that indicate how the user should reposition their face so that the imaging device can capture new user imaging data (e.g., user imaging data 401).

In some embodiments, the I/O module 417 can include a passive or interactive display module, such as a screen or touch screen. For example, the notification 402 can be displayed as a set of text instructions, images, or videos for the user. In some embodiments, the I/O module 417 can include a speaker component. For example, the notification 402 can be presented to the user as a set of audio instructions.

In some embodiments, multiple sets of user imaging data 401 can be processed by the identification device 410, based on multiple notifications (e.g., notifications 402) provided to the user. For example, first imaging data (e.g., user imaging data 401) can be captured and processed by the controller of the identification device 410. The controller 415 can generate instructions for how the user should reposition their face with respect to the imaging device 413 (either as instructions for how to move their face or how to move the identification device 410), and can subsequently cause the imaging device to capture second imaging data. This process can be iterated as many times as required by the controller 415. For example, the controller may have a quality or quantity threshold associated with capturing the user imaging data 401 from the user.

In some embodiments, the identification device 410 can be used to capture user imaging data 401 to be stored in the authentication module 411 (or in a data store such as data store 107 of FIG. 1) to authenticate (e.g., identify) a user of an authentication system (e.g., system 100 of FIG. 1). That is, with reference to FIG. 1, in some embodiments, the identification device 410 can be used to generate multimodal imaging data of an authenticated user to be used for authentication purposes (e.g., as stored in the aggregated dataset described with reference to FIG. 1).

Returning to FIG. 4, while the outline of a user's head is illustrated as the subject of user imaging data 401, it can be appreciated that the identification device 410 can be used to identify other subjects. For example, the identification device 410 can be used to collect imaging data about a user's body, or portion of a user's body (e.g., an arm or a hand). In another example, the identification device 410 can be used to collect imaging data about an object. For instance, the identification device can be used to collect imaging data about a physical security key.

Figure 5:
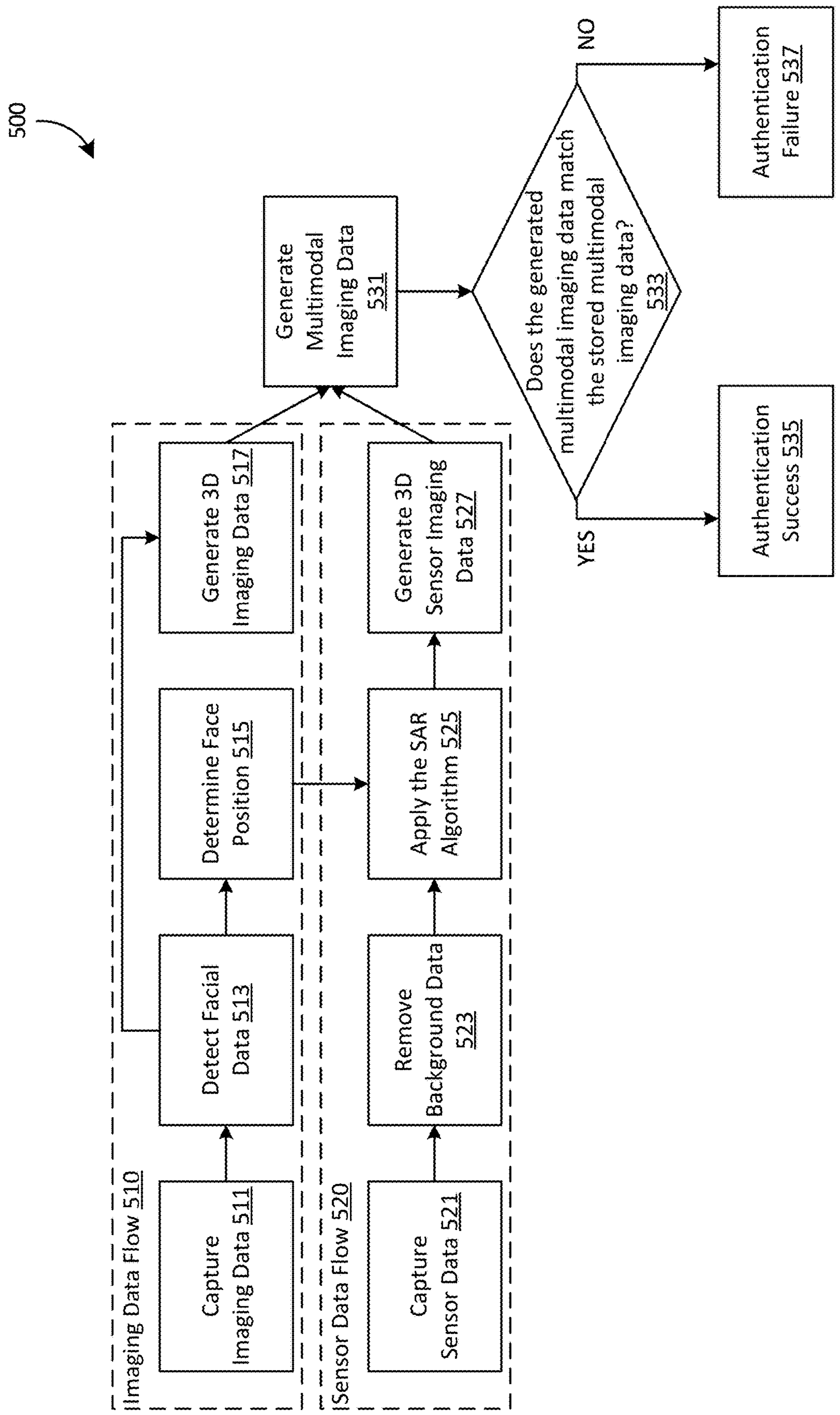
FIG. 5 is an example flow diagram of a method for using a multimodal facial identification system, according to aspects of the disclosure.

FIG. 5 is an example flow diagram of a method 500 for using a multimodal facial identification system, according to aspects of the disclosure. In some embodiments, the multimodal facial identification system can be same as, or similar to the system 100 as described with reference to FIG. 1. The method 500 can be performed by processing logic that can include hardware e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by imaging device 103 and/or the authentication module 104 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, operations in imaging data flow 510 (e.g., operations 511, 513, 515, and 517) can be performed simultaneously (e.g., in parallel with) operations in sensor data flow 520 (e.g., operations 521, 523, 525, and 527).

The imaging data flow 510 starts with operation 511, where the control logic performing the method 500 captures imaging data. In some embodiments, operation 511 can be the same as, or similar to operation 211 of FIG. 2. In some embodiments, operation 511 can be the same as, or similar to operations performed at the image capture device 301 block of FIG. 3A.

At operation 513, the control logic detects facial data. In some embodiments, operation 513 can be the same as, or similar to the face detection algorithm 311 block of FIG. 3A.

At operation 515, the control logic determines a facial position. In some embodiments, operation 515 can be the same as, or similar to operation 213 of FIG. 2. In some embodiments, operation 515 can be the same as, or similar to the face position algorithm 313 block of FIG. 3A.

At operation 517, the control logic generates 3D imaging data based on the facial data detected at operation 513. In some embodiments, the control logic can generate 3D imaging data based on imaging data captured and processed by the image capture device (e.g., image capture device 103 of FIG. 1). The imaging data can be provided as input to a machine learning model trained to generate three-dimensional (3D) imaging data based on a two-dimensional (2D) input. In some embodiments, the machine learning model can be a neural network model. In some embodiments, the machine learning model can use facial and non-facial data of the imaging data to generate the 3D imaging data.

The sensor data flow 520 starts with operation 521, where control logic performing the method 500 captures sensor data. In some embodiments, operation 521 can be the same as, or similar to operation 221 of FIG. 2. In some embodiments, operation 521 can be the same as, or similar to operations performed at the sensor unit 351 block of FIG. 3B.

At operation 523, the control logic removes background data from the sensor data captured at operation 521. In some embodiments, operation 523 can be the same as, or similar to the proximity detection algorithm 361 block of FIG. 3B.

At operation 525, the control logic applies the SAR algorithm to the sensor data with the removed background data. In some embodiments, the SAR algorithm can be applied using information obtained from the imaging data flow 510 (e.g., from operation 515). In some embodiments the operation 525 can be the same as, or similar to the operation 223 of FIG. 2. In some embodiments, the operation 525 can be the same as the SAR algorithm 363 block of FIG. 3B. In some embodiments, the control logic can generate sensor imaging data as a part of operation 525.

At operation 527, the control logic generates 3D sensor imaging data based on data obtained as output from the SAR algorithm at operation 525. In some embodiments, the control logic can extract z-coordinate (e.g., depth information) from the sensor data captured at operation 521, and processed at operations 523 and 525. For example, the input received at operation 527 can include one or more depths corresponding to distances between the receiving element of the sensor unit (e.g., sensor unit 120 of FIG. 1) and one or more proximate objects. In some embodiments, the control logic can transform these distances into 3D coordinate points (e.g., x-, y-, and z-coordinates). In some embodiments the control logic can otherwise transform the information received from operation 525 into a 3D representation of the sensor data (e.g., 3D sensor imaging data).

At operation 531, the control logic generates multimodal imaging data using the 3D imaging data of operation 517 (e.g., first imaging data) and the 3D sensor imaging data of operation 527 (e.g., second imaging data). In some embodiments, multimodal imaging data (e.g., user facial data) can be generated with additional imaging data obtained and processed from additional image capture devices and/or sensor units (e.g., third imaging data). In some embodiments, the multimodal imaging data can be generated by superimposing the 3D sensor imaging data (e.g., a first mode of imaging data) over the 3D imaging data (second mode of imaging data). For example, x-, y-, and z-coordinate data of the 3D sensor imaging data can be aggregated with x-, y-, and z-coordinate data of the 3D imaging data. The superimposed 3D data (e.g., aggregated x-, y-, and z-coordinate data) can represent the multimodal imaging data.

In some embodiments, the multimodal imaging data can be generated by processing the 3D imaging data with the 3D sensor imaging data. That is, portions of the 3D imaging data and portions of the 3D sensor imaging data can be used to generate new data. For example, x-, y-, and z-coordinate data of the 3D imaging data can be averaged with corresponding x-, y-, and z-coordinate data of the 3D sensor imaging data to generate new 3D data. In another example, an algorithm can transform the 3D imaging data and the 3D sensor imaging data into a new 3D data output. In another example, the 3D imaging data and the 3D sensor imaging data can be combined by a machine learning model that generates a new 3D data output based on two or more 3D data inputs. The new 3D data (e.g., newly generated x-, y-, and z-coordinate data) can represent the multimodal imaging data.

In some embodiments, if the 3D imaging data and the 3D sensor imaging data have large discrepancies, the control logic can indicate an authentication failure. For example, if the 3D imaging data indicates certain varying z-coordinates of a user's face, but the 3D sensor imaging data indicates that the user's face is a uniformly flat surface (e.g., such as an image or video of the user's face), the control logic can skip to operation 537 and indicate an authentication failure. In some embodiments, the size of the discrepancies required to skip to the indication that the authentication has failed is configurable. In some embodiments, if the 3D imaging data and the 3D sensor imaging data contain different datasets (e.g., different facial features), the control logic can indicate an authentication failure. For example, if the 3D imaging data indicates that the user is smiling, but the 3D sensor imaging data indicates the user is not smiling, the control logic can skip to operation 537 and indicate an authentication failure.

At operation 533, the control logic can determine whether the generated multimodal imaging data of operation 531 matches stored multimodal imaging data from an authenticated user dataset. In some embodiments, the operation 533 can be the same as, or similar to operation 230 of FIG. 2. In some embodiments, the control logic can determine whether the generated multimodal imaging data matches a specific authenticated user multimodal imaging data. In some embodiments, the control logic can determine whether the generated multimodal imaging data matches any set of multimodal imaging data for the group of authenticated users.

At operation 535, responsive to determining that the generated multimodal imaging data of operation 531 matches stored multimodal imaging data, the control logic can indicate that the authentication was successful.

At operation 537, responsive to determining that the generated multimodal imaging data of operation 531 does not match stored multimodal imaging data, the control logic can indicate that the authentication failed. In some embodiments, an authentication failure at operation 537 can be used as an indication to restart the imaging data flow 510 and/or sensor data flow 520. In some embodiments, at operation 537, different types of authentication failures can be indicated. For example, if the value of the discrepancy (e.g., a difference) between the stored multimodal imaging data and the generated multimodal imaging data is relatively small, the imaging data flow 510 and sensor data flow 520 can be restarted in an attempt to capture new imaging data and sensor data. In another example, if the value of the discrepancy between the stored multimodal imaging data and the generated multimodal imaging data is relatively large, an alert or indication can be generated by the control logic. For instance, if the control logic determines that the 3D imaging data indicates various z-coordinate depths, but that the 3D sensor imaging data indicates uniformly flat surface, the control logic can generate an alert that a user may be attempting to spoof the facial identification portion of the authentication system (e.g., system 100 of FIG. 1).

Figure 6:
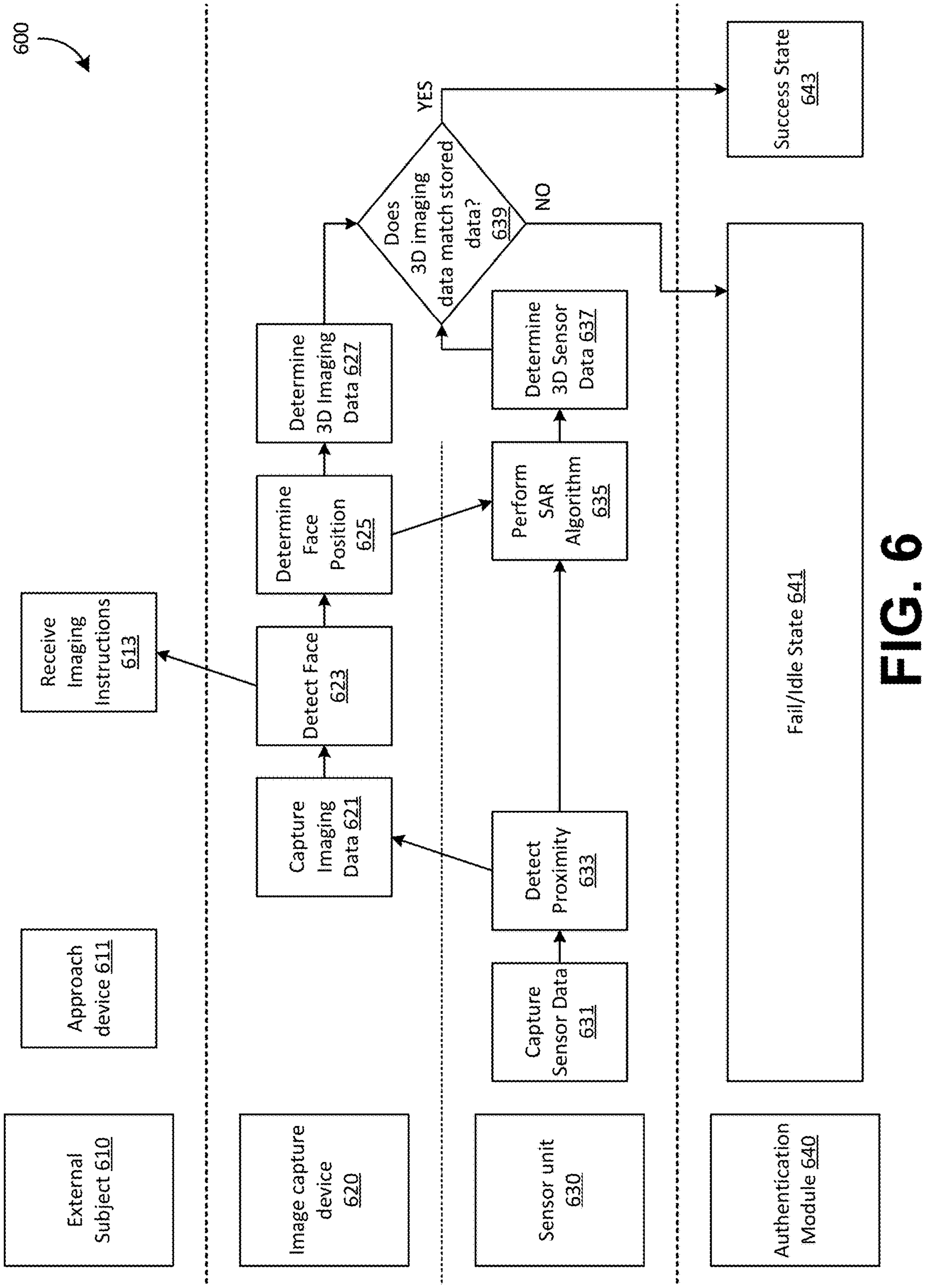
FIG. 6 is an example of a swimlane diagram pertaining to an authentication system, according to aspects of the disclosure.

FIG. 6 is an example of a swimlane diagram 600 pertaining to an authentication system, according to aspects of the disclosure. Elements along the left-hand side of the swimlane diagram 600 represent an external subject 610, and components of an authentication system, image capture device 620, sensor unit 630, and authentication module 640. It can be appreciated that the external subject 610 is not included in the authentication system (e.g., system 100 of FIG. 1) and is represented here to show the interaction between the authentication system and the external subject 610.

At block 641, the authentication module 640 is in a default fail/idle state. That is, unless or until the authentication module 640 receives the proper indication (e.g., yes, the 3D imaging data matches the stored data), the authentication module 640 does not permit access to a secured resource (e.g., location, electronic database, etc.).

At block 631, the sensor unit 630 can continuously capture sensor data. In some embodiments, the sensor unit 630 can continuously capture sensor data at a low collection rate (e.g., longer time interval in between pulses). In some embodiments, the sensor unit can increase the sensor data collection rate (e.g., shorten the time interval in between pulses) when an object enters a certain area or distance from the sensor unit 630 (e.g., as described below in block 633).

At block 611, a user (e.g., external subject 610) approaches the device containing the sensor unit 630.

At block 633, the sensor unit 630 can detect a proximity of the external subject 610, and can trigger the image capture device 620 to begin capturing imaging data. In some embodiments, the sensor data captured at block 633 can be greater in quantity and/or quality than the sensor data captured at block 631. For example, as described with reference to block 631, once a proximity of the external subject 610 is within a certain threshold (e.g., the external subject 610 is "proximate" to the sensor unit 630), the sensor unit 630 can decrease the interval of time in between transmitting pulses. In another example, after proximity of the external subject 610 is detected, the sensor unit 630 can alter other data collection parameters, such as sensor position, pulse intensity, pulse characteristics, etc. For instance, in embodiments where the sensor unit 630 is a SAR sensor unit, at block 633 the sensor unit 630 can begin collecting sensor data as the SAR sensor is electronically steered along a specific path.

At block 621, responsive to the sensor unit 630 detecting the proximity of the external subject 610 at block 633, the image capture device 620 can begin to capture imaging data. In some embodiments, as similarly described at block 633, at block 621, the image capture device 620 can increase the quantity and/or quality of imaging data collected. That is, prior to block 621, the image capture device 620 can be capturing imaging data, but at a lower quantity/quality (e.g., lower frames-per-second, a lower resolution, etc.).

At block 623, the image capture device 620 (or control logic coupled to the image capture device 620) can detect a face (e.g., facial data) in a portion of the captured imaging data. In some embodiments, the facial detection can be performed using a machine learning model.

At block 613, a notification for the external subject 610 can be generated. For example, the external subject 610 can be instructed to rotate their head or face. In some embodiments, the image capture device 620 can continue to capture imaging data (e.g., block 621) while the instructions (e.g., block 613) are provided to the external subject 610.

At block 625, the image capture device (or control logic coupled to the image capture device 620) can determine facial position data of the face of the external subject 610. In some embodiments, the facial position data can include x-, y-, and z-coordinate data. In some embodiments, the facial position data can be determined using a machine learning model, such as a neural network.

At block 627, the image capture device (or control logic coupled to the image capture device 620) can determine 3D imaging data of the user's face. In some embodiments, the facial position data of block 625 can be used to determine 3D imaging data, such as is described above with reference to FIG. 5.

At block 635, after determining facial position data at block 625, the sensor unit 630 (or control logic coupled to the sensor unit 630) can perform the SAR algorithm. In some embodiments, the SAR algorithm can be based on the face position data of block 625. In some embodiments, the SAR algorithm can be a processing algorithm. That is, the SAR algorithm can be performed on previously captured date (e.g., sensor data captured at block 631 and/or block 633). In some embodiments, the SAR algorithm can be performed to capture new sensor data (e.g., the sensor unit can be configured to capture sensor data based on the SAR algorithm).

At block 637, the sensor unit 630 (or control logic coupled to the sensor unit 630) can determine 3D sensor data corresponding to the user's face, such as is described above with reference to FIG. 5.

At block 639, the 3D imaging data of block 627 and the 3D sensor data of block 637 can be combined and compared to corresponding multimodal imaging data stored in a dataset of multimodal imaging data of authenticated users. If the 3D imaging data does not correspond to the 3D sensor data (as described above), then the authentication module 640 can remain in the fail/idle state. If the 3D imaging data does correspond to the 3D sensor data (as described above), and matches multimodal imaging data stored in the dataset of multimodal imaging data of authenticated users, the authentication module 640 can transition to the success state 643. In some embodiments, the authentication module 640 can remain in the success state 643 for a predetermine amount of time. In some embodiments, the authentication module 640 can remain in the success state until a triggering event. For example, an authentication module 640 for a locked door can remain in the success state 643 until the door has been opened.

Figure 7:
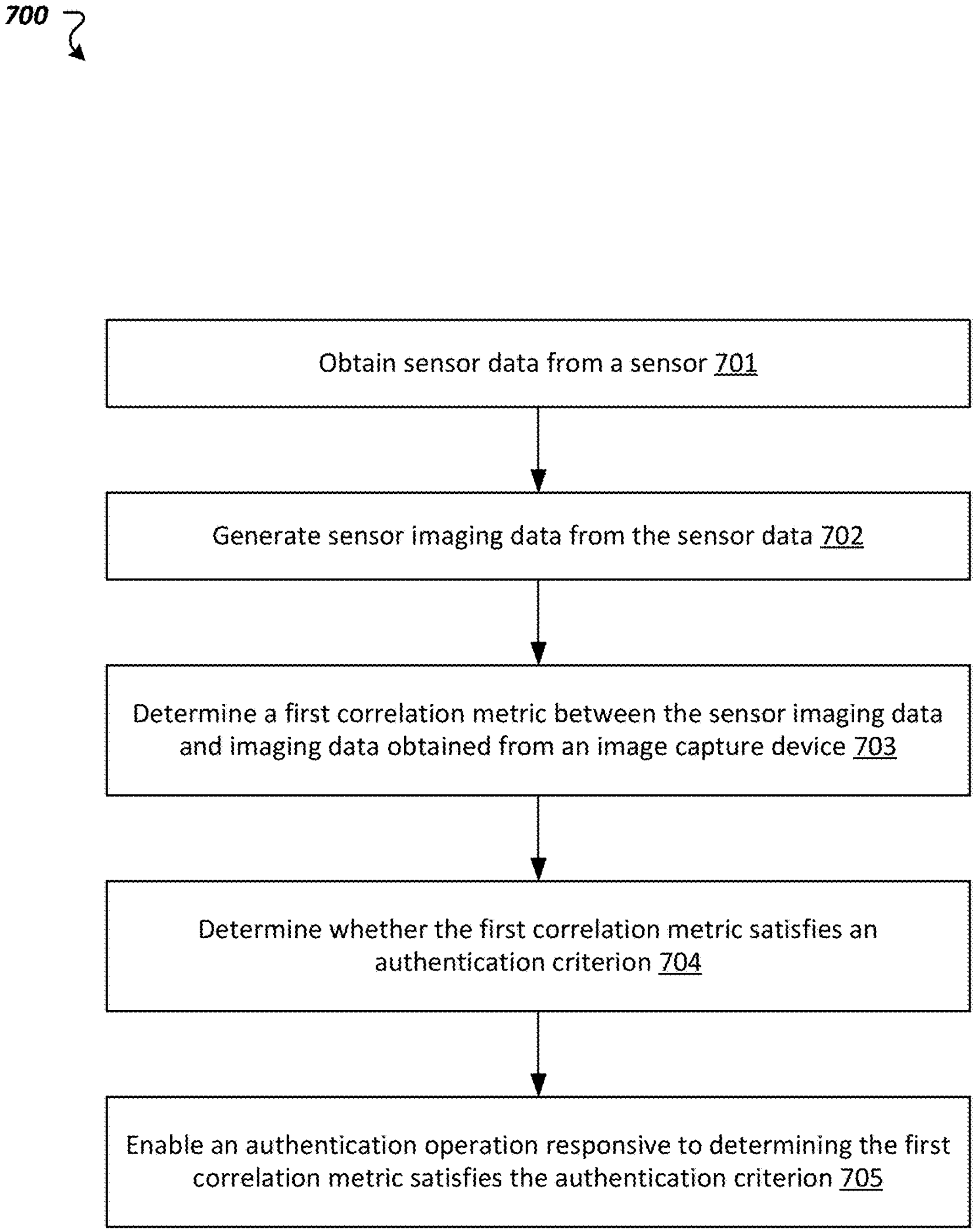
FIG. 7 is an example flow diagram of a method for using a multimodal facial identification system according to aspects of the disclosure.

FIG. 7 is an example flow diagram of a method 700, according to aspects of the disclosure. The method 700 can be performed by processing logic that can include hardware e.g., processing device, circuitry, dedicated logic, programmable logic, microcode, hardware of a device, integrated circuit, etc.), software (e.g., instructions run or executed on a processing device), or a combination thereof. In some embodiments, the method 700 can be performed by imaging device 103 and/or the authentication module 104 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 701, the control logic performing the method 700 obtains sensor data from a sensor (e.g., sensor unit 120 of FIG. 1). In some embodiments, the sensor can be at least one of a Radio Detection and Ranging (RADAR) unit, a Synthetic Aperture Radar (SAR) unit, a thermal imaging sensor unit, a Sound Navigation and Ranging (SONAR) unit, an ultrasonic sensor unit, a hyperspectral imaging sensor unit, an electromagnetic field sensor unit, a radio frequency (RF) sensor unit, or a magnetic resonance imaging (MRI) unit. In some embodiments, the RF sensor unit can operate in or around frequencies used for Wi-Fi® devices (e.g., 2.4 GHz, 5.0 GHz, etc.), or in or around frequencies used for ultra-wideband (UWB) communications (e.g., 3.1 GHz to 10.6 GHz in the United States, etc.).

In some embodiments, the control logic can determine whether the sensor data satisfies a quality criterion. The control logic provides a notification to the user (e.g., user of system 100 of FIG. 1) indicating whether the sensor data satisfies the quality criterion. In some embodiments, if the sensor data does not satisfy the quality criterion, the notification can indicate instructions for the user to alter the orientation of their face and/or of the facial identification device (e.g., identification device 410 of FIG. 4). The sensor unit can capture new sensor data as the user is instructed to change the orientation of their face and/or of the facial identification device, and new sensor imaging data can be generated based on the newly captured sensor data. In some embodiments, both the original sensor data and the newly captured sensor data can be used to generate the new sensor imaging data.

At operation 702, the control logic generates sensor imaging data from the sensor data. In some embodiments where the sensor is a RADAR unit, control logic can obtain the sensor data by determining a path for the RADAR unit based on a first portion of imaging data (e.g., imaging data captured by the image capture device). The control logic can electronically steer the RADAR unit along the path to capture a portion of the sensor data using the RADAR unit. In some embodiments, other processing techniques can be used to increase sensor data resolution. For example, the object (e.g., face of a human) can be scanned from two or more locations. In another example, processing techniques such as a neural network can be used to increase the resolution of the sensor data. The neural network can be trained to interpret sensor data and infer new data for areas where the sensor data may be deficient. In some embodiments, the neural network is trained to determine which portions of sensor data are more critical. The neural network output can indicate how new sensor data should be captured, or how current sensor data can be processed to address potential deficiencies in the currently captured sensor data.

In some embodiments, the control logic can determine whether the sensor data satisfies a quality criterion. If the sensor data does not satisfy the quality criterion, the control logic can determine a new path for the RADAR unit using new imaging data captured by the image capture device and electronically steer the RADAR unit along the new path to capture another portion of the sensor data using the RADAR unit. If the sensor data does satisfy the quality criterion, the control logic can indicate that sensor imaging data is to be generated using the sensor data.

At operation 703, the control logic determines a first correlation metric between the sensor imaging data and imaging data obtained from an image capture device. In some embodiments, the control logic can determine first depth data (e.g., z-coordinate data) from the imaging data, and second depth data (e.g., z-coordinate data) from the sensor imaging data. In some embodiments, the correlation metric can be based on a discrepancy (e.g., a difference) between the first depth data and the second depth data. In some embodiments, depth data of the imaging data can be determined by providing the imaging data to a machine learning model trained to output three-dimensional (3D) imaging data based on a two-dimensional (2D) input. In some embodiments, depth data for sensor data can be determined by providing the imaging data to a machine learning model trained to output 3D imaging data based on a sensor data input.

At operation 704, the control logic determines whether the first correlation metric satisfies the authentication criterion. In some embodiments, once the first correlation metric is determined to satisfy the authentication criterion, the control logic can determine whether an authentication metric satisfies the authentication threshold. The authentication metric can be based on a discrepancy between a combination including the imaging data and the sensor imaging data, and stored authenticated user data (e.g., combined imaging and sensor imaging data). In some embodiments, the authentication criterion can be satisfied when the correlation metric and the authentication metric each satisfy the authentication criterion.

In some embodiments, the sensor imaging data and the imaging data can include facial and non-facial data (respectively). The control logic can determine the correlation metric between the sensor imaging data and the imaging data based on each respective facial data. In some embodiments, the first correlation metric can be determined based on each respective facial data. In some embodiments, the if the discrepancy between each respective facial data is below a discrepancy threshold, the control logic can indicate that the correlation metric satisfies the authentication criterion.

In some embodiments, the control logic can determine a time to begin capturing sensor data based on information extracted from imaging data captured by the image capture device. In some embodiments, the control logic can receive an indication from the image capture device to begin capturing sensor data.

At operation 705, the control logic enables an authentication operation responsive to determining the first correlation metric satisfies the authentication criterion.

Figure 8:
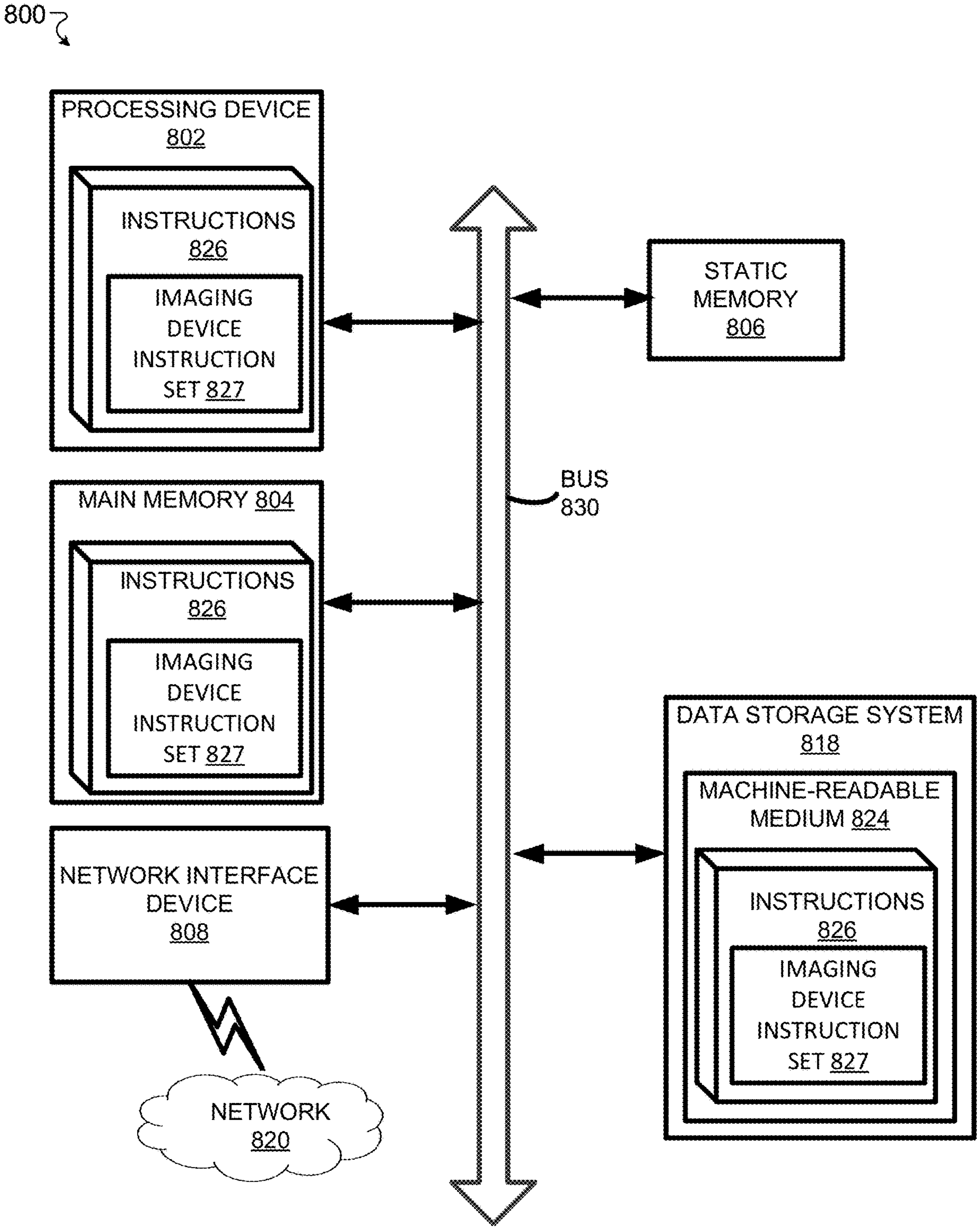
FIG. 8 illustrates an example machine of a computer system within which a set of instructions, for causing the machine to perform any one or more of the methodologies discussed herein, can be executed, in accordance with aspects of the disclosure.

FIG. 8 illustrates an example machine of a computer system 800 within which a set of instructions, for causing the machine to perform any one or more of the methodologies discussed herein, can be executed, in accordance with aspects of the disclosure. In some embodiments, the computer system 800 can correspond to a computing device that can be used to perform the operations of enablement for gain-mask machine learning, audio channel-based signal enhancement (e.g., the system 100 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable storage medium or non-transitory computer-readable storage medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the system 100 of FIG. 1.

In one embodiment, the instructions 826 include instructions to implement functionality corresponding to the system 100 of FIG. 1. In some embodiments, the instructions 826 can include imaging device instruction set 827, corresponding to the imaging device 103 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "allocating," "dynamically allocating," "redistributing," "ignoring," "reallocating," "detecting," "performing," "polling," "registering," "monitoring," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, compact disc read-only memories (CD-ROMs) and magnetic-optical disks, read-only memories (ROMs), random access memories (RAMs), erasable programmable read-only memories (EPROMs), electrically erasable programmable read-only memories (EEPROMs), magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A device comprising:

a sensor comprising a Radio Detection and Ranging (RADAR) unit; and a processing device coupled to the sensor, wherein the processing device is to:

obtain sensor data from the sensor;

generate first imaging data from the sensor data;

obtain second imaging data from an image capture device, wherein to obtain the sensor data, the processing device is to determine a first path for the RADAR unit based on a first portion of the second imaging data, and electronically steer the RADAR unit along the first path to capture a first portion of the sensor data with the RADAR unit;

determine a first correlation metric between the first imaging data and the second imaging data, wherein the first correlation metric is based on first depth data corresponding to the first imaging data and second depth data corresponding to the second imaging data;

determine whether the first correlation metric satisfies an authentication criterion based on a discrepancy between the first depth data and the second depth data; and enable an authentication operation responsive to determining the first correlation metric satisfies the authentication criterion, wherein the authentication operation determines that a user is an authenticated user.

2. The device of claim 1, wherein the processing device is further to:

determine whether the sensor data comprising the first portion of the sensor data satisfies a quality criterion;

determine a second path for the RADAR unit based on third imaging data obtained from the image capture device responsive to determining that the sensor data does not satisfy the quality criterion; and electronically steer the RADAR unit along the second path to capture a second portion of sensor data with the RADAR unit.

3. The device of claim 2, wherein to generate the first imaging data from the sensor data, the processing device is to:

determine whether the sensor data comprising the first portion and the second portion of sensor data satisfies the quality criterion; and indicate the first imaging data is to be generated using the sensor data comprising the first portion and the second portion of sensor data responsive to determining the sensor data satisfies the quality criterion.

4. The device of claim 1, wherein to determine the first correlation metric, the processing device is to:

determine the first depth data from the first imaging data; and determine the second depth data from the second imaging data; and wherein to determine whether the first correlation metric satisfies the authentication criterion, the processing device is to:

determine whether the discrepancy between the first depth data and the second depth data is less than a discrepancy threshold, and indicate that the authentication criterion is satisfied responsive to determining the discrepancy is less than the discrepancy threshold.

5. The device of claim 4, wherein to determine the first depth data from the first imaging data the processing device is to:

provide the first imaging data to a machine learning model trained to output three dimensional (3D) imaging data based on a two-dimensional (2D) input;

obtain first 3D data as output from the machine learning model, wherein the first 3D data is generated by the machine learning model based on an input comprising the first imaging data; and extract the first depth data from the first 3D data.

6. The device of claim 1, wherein to obtain the sensor data from the sensor, the processing device is to:

determine whether the sensor data comprising a first portion of the sensor data satisfies a quality criterion;

provide a notification to a user responsive to determining the sensor data does not satisfy the quality criterion;

obtain a second portion of sensor data;

determine whether the sensor data comprising the first portion and the second portion of sensor data satisfies the quality criterion; and indicate that the second imaging data is to be generated using the sensor data comprising the first portion and the second portion of sensor data responsive to determining the sensor data satisfies the quality criterion.

7. The device of claim 1, wherein the first imaging data comprises first facial data and first non-facial data and the second imaging data comprises second facial data and second non-facial data;

wherein to determine the first correlation metric between the first imaging data and the second imaging data, the processing device is to combine the first facial data with the second facial data to obtain user facial data; and wherein to determine whether the first correlation metric satisfies the authentication criterion, the processing device is to:

determine whether a difference between the user facial data and a stored user facial data corresponding to an authenticated user is less than a discrepancy threshold, and indicate that the authentication criterion is satisfied responsive to determining the difference is less than the discrepancy threshold.

8. The device of claim 1, wherein the processing device is further to:

receive an indication from the image capture device to begin capturing information with the sensor, wherein the information comprises the sensor data.

9. The device of claim 1, wherein the sensor is at least one of a Synthetic Aperture Radar (SAR) unit, a thermal imaging sensor unit, a Radio Detection and Ranging (RADAR) unit, a Sound Navigation and Ranging (SONAR) unit, an ultrasonic sensor unit, a hyperspectral imaging sensor unit, an electromagnetic field sensor unit, a radio frequency (RF) sensor unit, or a magnetic resonance imaging (MRI) unit.

10. A system comprising:

a first sensor unit;

an image capture device; and processing device coupled to the first sensor unit and the image capture device, wherein the processing device is to:

obtain first imaging data from the image capture device;

determine first depth data from the first imaging data;

obtain first sensor data from the first sensor unit;

generate second imaging data from the first sensor data;

determine second depth data from the second imaging data;

determine a first correlation metric between the first imaging data and the second imaging data, wherein the first correlation metric is based on the first depth data corresponding to the first imaging data and the second depth data corresponding to the second imaging data;

determine whether the first correlation metric satisfies an authentication criterion based on a discrepancy between the first depth data and the second depth data, wherein the processing device is to determine whether the discrepancy between the first depth data and the second depth data is less than a discrepancy threshold, and indicate that the authentication criterion is satisfied responsive to determining the discrepancy is less than the discrepancy threshold; and enable an authentication operation responsive to determining the first correlation metric satisfies the authentication criterion, wherein the authentication operation determines that a user is an authenticated user.

11. The system of claim 10, wherein the first sensor unit comprises a Radio Detection and Ranging (RADAR) unit, and wherein to obtain the first sensor data the processing device is to:

determine a path for the RADAR unit based on the first imaging data; and electronically steer the RADAR unit along the path to capture a first portion of the first sensor data with the RADAR unit.

12. The system of claim 10, wherein the first imaging data comprises first facial data and first non-facial data and the second imaging data comprises second facial data and second non-facial data;

wherein to determine the first correlation metric between the first imaging data and the second imaging data, the processing device is to combine the first facial data with the second facial data to obtain user facial data; and wherein to determine whether the first correlation metric satisfies the authentication criterion, the processing device is to:

determine whether a difference between the user facial data and a stored user facial data corresponding to an authenticated user is less than a discrepancy threshold, and indicate that the authentication criterion is satisfied responsive to determining the difference is less than the discrepancy threshold.

13. The system of claim 10 further comprising a second sensor unit coupled to the processing device, wherein the processing device is to:

obtain second sensor data from the second sensor unit;

generate third imaging data from the second sensor data;

determine a second correlation metric based on the first imaging data the second imaging data and the third imaging data;

determine whether the second correlation metric satisfies the authentication criterion; and enable the authentication operation responsive to determining the second correlation metric satisfies the authentication criterion.

14. The system of claim 10, wherein the first sensor unit is at least one of a Synthetic Aperture Radar (SAR) unit, a thermal imaging sensor unit, a Radio Detection and Ranging (RADAR) unit, a Sound Navigation and Ranging (SONAR) unit, an ultrasonic sensor unit, a hyperspectral imaging.

15. A method comprising:

obtaining sensor data from a sensor;

generating first imaging data from the sensor data;

determining first depth data from the first imaging data;

determining second depth data from second imaging data obtained from an image capture device;

determining a first correlation metric between the first imaging data and second imaging data, wherein the first correlation metric is based on the first depth data corresponding to the first imaging data and the second depth data corresponding to the second imaging data;

determining whether the first correlation metric satisfies an authentication criterion based on a discrepancy between the first depth data and the second depth data, said determining including determining whether the discrepancy between the first depth data and the second depth data is less than a discrepancy threshold, indicating that the authentication criterion is satisfied responsive to determining the discrepancy is less than the discrepancy threshold; and enabling an authentication operation responsive to determining the first correlation metric satisfies the authentication criterion, wherein the authentication operation determines that a user is an authenticated user.

16. The method of claim 15, wherein the sensor comprises a Synthetic Aperture Radar (SAR) unit, and wherein obtaining the sensor data from the sensor comprises:

determining a path for the RADAR unit based on the second imaging data; and electronically steering the RADAR unit along the path to capture a first portion of the sensor data with the RADAR unit.

17. The method of claim 15, wherein obtaining the sensor data from the sensor comprises:

determining whether the sensor data comprising a first portion of the sensor data satisfies a quality criterion;

providing a notification to a user responsive to determining the sensor data does not satisfy the quality criterion;

obtaining a second portion of sensor data;

determining whether the sensor data comprising the first portion and the second portion of sensor data satisfies the quality criterion; and indicating the first imaging data is to be generated using the sensor data comprising the first portion and the second portion of sensor data responsive to determining the sensor data satisfies the quality criterion.

* * * * *